(12) United States Patent
Dashevsky et al.

(10) Patent No.: US 10,871,836 B2
(45) Date of Patent: Dec. 22, 2020

(54) SYSTEM AND METHOD FOR UNINTENTIONAL INPUT REJECTION

(71) Applicant: Apple Inc., Cupertino, CA (US)

(72) Inventors: David D. Dashevsky, Cupertino, CA (US); Prashanth Holenarsipur, Fremont, CA (US); Stephen N. Sweet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/029,456

(22) Filed: Jul. 6, 2018

(65) Prior Publication Data

US 2020/0012355 A1 Jan. 9, 2020

(51) Int. Cl.
*G06F 3/0362* (2013.01)
*G04G 21/08* (2010.01)
*G06F 3/044* (2006.01)

(52) U.S. Cl.
CPC .......... *G06F 3/0362* (2013.01); *G04G 21/08* (2013.01); *G06F 3/044* (2013.01); *G06F 2203/04108* (2013.01)

(58) Field of Classification Search
CPC ......... G06F 3/0362; G06F 2203/04108; G06F 3/044; G04G 21/08
See application file for complete search history.

(56) References Cited

U.S. PATENT DOCUMENTS

| | | | |
|---|---|---|---|
| 3,823,550 A | 7/1974 | Bergey | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Mark W Regn
(74) *Attorney, Agent, or Firm* — Kubota & Basol LLP

(57) ABSTRACT

A wearable device is disclosed. The wearable device can comprise a housing; a crown; a proximity sensor; and a processor. The crown can be configured to receive input from a user. The proximity sensor can be configured to generate a field of view encompassing a first area adjacent to the housing and further configured to generate an output signal corresponding to whether an object is present within the field of view. The processor can be configured to determine, based on the output signal, whether the input corresponds to an intentional input or an unintentional input.

29 Claims, 12 Drawing Sheets

(56) References Cited

U.S. PATENT DOCUMENTS

| | | |
|---|---|---|
| 8,479,122 B2 | 7/2013 | Hotelling et al. |
| 2006/0197753 A1 | 9/2006 | Hotelling |
| 2012/0262407 A1* | 10/2012 | Hinckley ................ G06F 3/038 345/173 |
| 2013/0249826 A1* | 9/2013 | Jung ....................... G06F 3/041 345/173 |
| 2014/0002406 A1* | 1/2014 | Cormier, Jr. ............ G06F 3/044 345/174 |
| 2015/0324004 A1* | 11/2015 | Lee ......................... G06F 3/017 345/156 |
| 2016/0065831 A1* | 3/2016 | Howard ............. H04N 5/23206 348/211.2 |
| 2017/0010751 A1* | 1/2017 | Shedletsky ........... G06F 3/0362 |
| 2017/0090592 A1 | 3/2017 | Ely et al. |
| 2017/0090599 A1 | 3/2017 | Kuboyama et al. |
| 2017/0300559 A1* | 10/2017 | Fallah .................. G06F 3/0237 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

# SYSTEM AND METHOD FOR UNINTENTIONAL INPUT REJECTION

FIELD

The disclosed examples relate generally to rejection of unintentional inputs detected at electronic devices, including but not limited to, rejection of unintentional inputs detected at crowns of electronic watches.

BACKGROUND

The examples described herein refer to detection of an object (e.g., a finger or hand of a user) proximate to a crown of a wearable device (e.g., a watch worn by the user). Example crowns may be responsive to input provided by a user of the device via any suitable means, including mechanical means (e.g., pushing or rotating the crown) and/or electronic means (e.g., capacitive sensing). In some examples, the wearable device may be worn on a user's hand, wrist, or arm, or another body part that is subject to frequent movement and exposure to the user's environment. Further, in some examples, a crown of the wearable device may be positioned such that it is vulnerable to accidental touches. For example, on a wearable watch worn on a user's wrist, featuring a crown that extends outward from the watch toward the user's hand, the crown may be accidentally pressed by the back of the user's hand as the user's wrist bends and flexes during ordinary user movement. The crown may also be accidentally pressed by collisions with objects in the user's environment (e.g., the pocket of a user's hands when inserting the hand into the pocket). Unintentional touches can cause unexpected behavior, in which the device responds to input that the user did not intend to present. Further, in devices that conserve power by operating in a rest mode in the absence of user input, power usage can be wastefully high when the rest mode is prematurely exited in response to unintentional touches. It can be difficult to distinguish such unintentional touches from intentional touches (e.g., from the user's finger) based on crown input alone. Some techniques for distinguishing unintentional touches from intentional touches may be overzealous, frustrating the user by incorrectly rejecting intentional touches.

SUMMARY

This disclosure generally relates to a wearable device, such as a watch, with an input mechanism, such as a crown, where the device is configured to distinguish intentional inputs from unintentional inputs. The wearable device can include a proximity sensor configured to detect the presence of objects (e.g., a user's wrist) proximate to the device. In some cases, when an input is detected at the input mechanism, the proximity sensor can be queried to identify whether an object is proximate to the device; and a decision can be made whether the detected input is more probably an intentional input, such as provided by a finger; or an unintentional input, such as provided by another body part, or by an object in the user's environment. In some examples, additional data can be used to inform this decision, such as the orientation of the wearable device; the duration of the input; and a force vector detected at the input mechanism.

In some examples, a wearable device is disclosed. The wearable device can comprise a housing; a crown; a proximity sensor; and a processor. The crown can be configured to receive input from a user. The proximity sensor can be configured to generate a field of view encompassing a first area adjacent to the housing and further configured to generate an output signal corresponding to whether an object is present within the field of view. The processor can be configured to determine, based on the output signal, whether the input corresponds to an intentional input or an unintentional input.

DETAILED DESCRIPTION

In the following description of this disclosure and examples, reference is made to the accompanying drawings in which it is shown by way of illustration specific examples that can be practiced. It is to be understood that other examples can be practiced and structural changes can be made without departing from the scope of this disclosure.

Figure 1A:
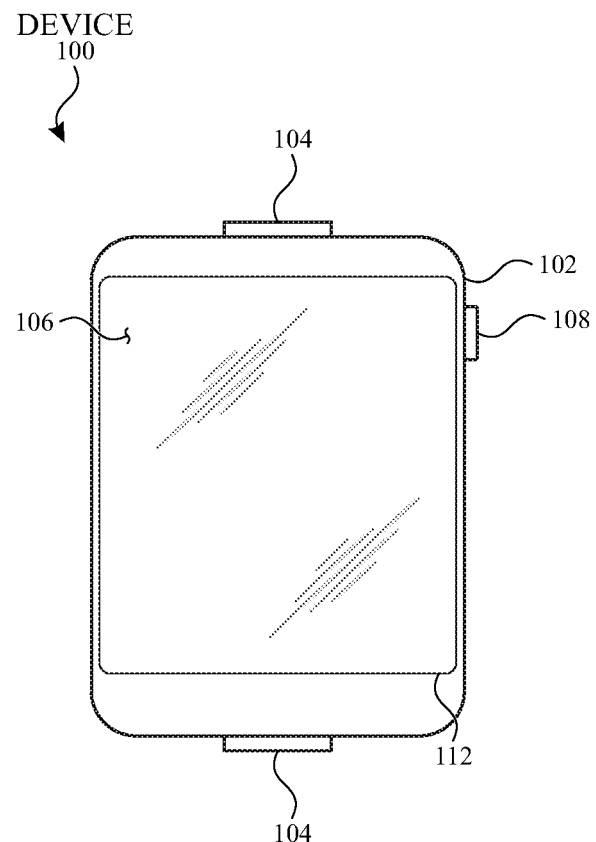
FIGS. 1A and 1B illustrate an exemplary wearable device according to examples of this disclosure.
Figure 1B:
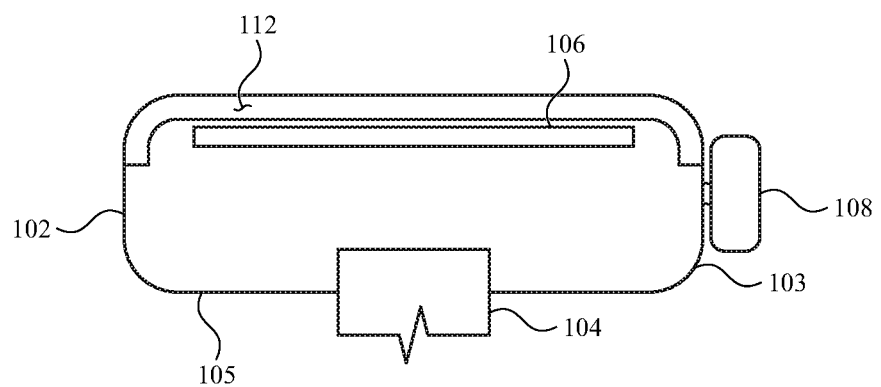

FIGS. 1A-1B illustrate an exemplary wearable electronic device 100 according to examples of this disclosure. In the illustrated example, device 100 is a watch that generally includes housing 102 and strap 104 for affixing device 100 to the body of a user. That is, device 100 is wearable. Housing 102 can be designed to couple with straps 104. Housing 102 can include a bottom surface 105 and side surfaces 103. Device 100 can have touch-sensitive display screen (hereafter touchscreen) 106 and crown 108. Device 100 can further include a cover glass 112. For convenience, the cover glass is described in the examples herein as being formed of glass, however, in other examples the cover glass can be formed of any suitable transparent or partially transparent material including, but not limited to, plastics, acrylics, or any combination of suitable transparent or partially transparent materials. Moreover, although the examples discussed herein focus primarily on wearable devices, it should be noted that the examples discussed herein can be used in other electronic devices having a cover glass, including, but not limited to, cellular phones, laptops, or tablet devices.

Touchscreen 106 can include a display device, such as a liquid crystal display (LCD), light-emitting diode (LED) display, organic light-emitting diode (OLED) display, or the like, positioned partially or fully behind or in front of a touch sensor panel or integrated with the panel and implemented using any desired touch sensing technology, such as mutual-capacitance touch sensing, self-capacitance touch sensing, resistive touch sensing, projection scan touch sensing, or the like. Touchscreen 106 can allow a user to perform various functions by touching or hovering near the touch sensor panel using one or more fingers or other objects.

Device 100 can further include a crown 108. Conventionally, the term "crown," in the context of a watch, refers to the cap atop a stem for winding the watch. In the context of a personal electronic device, the crown can be a physical component of the electronic device, rather than a virtual crown on a touch sensitive display. Crown 108 can be mechanical, meaning that it can be connected to a sensor for converting physical movement of the crown into electrical signals. In some examples, crown 108 can rotate in two directions of rotation (e.g., forward and backward). Crown 108 can also be pushed in towards the housing of device 100 and/or be pulled away from device 100. In some examples, more than one crown 108 can be used. The visual appearance of crown 108 can, but need not, resemble crowns of conventional watches.

Figure 2A:
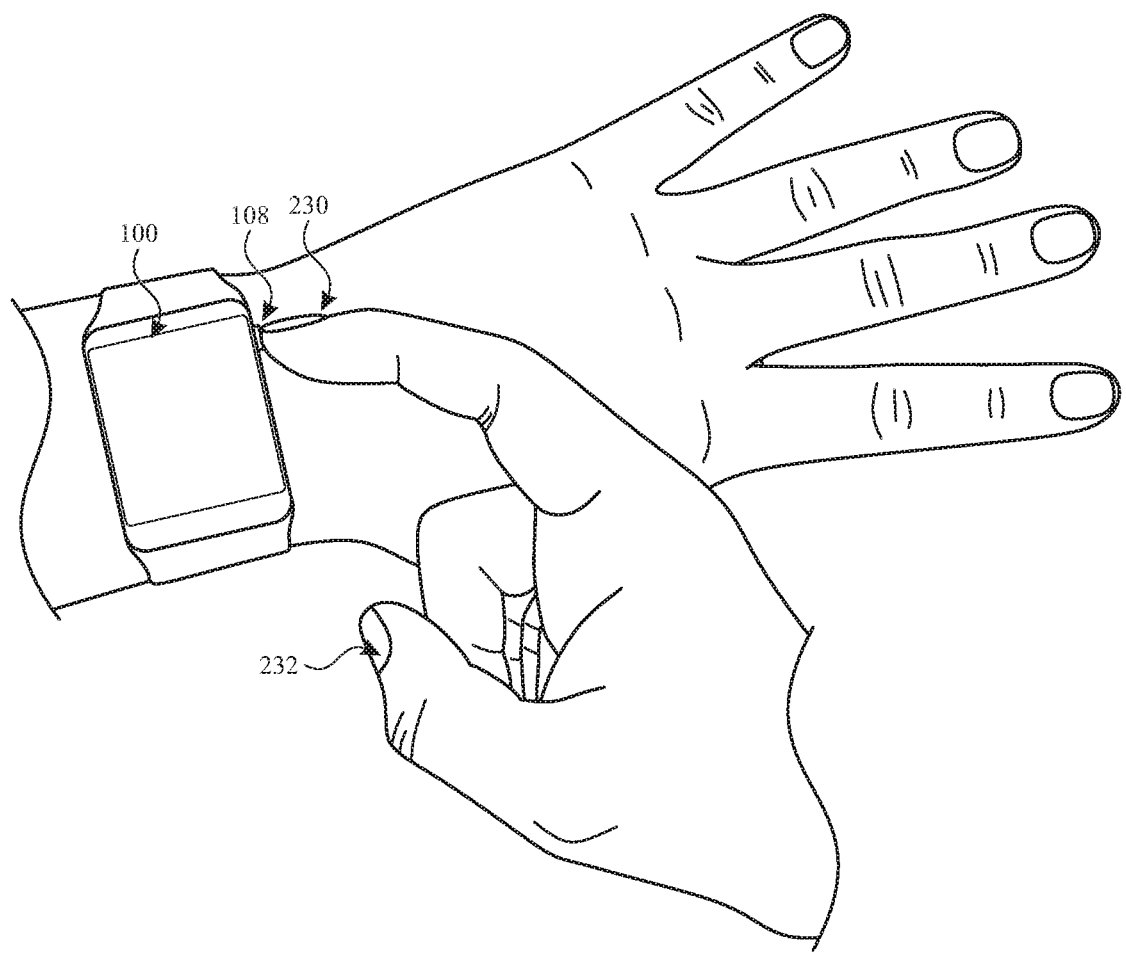
FIG. 2A illustrates an exemplary intentional finger input provided at an exemplary wearable device according to examples of this disclosure.

FIG. 2A illustrates an example of a user providing intentional input to device 100 according to examples of the disclosure. If a user intends to interact with device 100, the user can provide input via the crown 108. For example, the user may provide input by rotating, pushing, or pulling the crown 108, as described above; in some cases, this crown input may provide input signals to software executing on a processor of device 100. This crown input can be provided by one or more of the user's fingertips. As one example, shown in FIG. 2A, the tip of the user's index finger 230 can be used to push the crown 108 toward the housing of device 100. In other examples, the user may grip the crown 108 between the tips of the user's thumb 232 and index finger 230, and pull or rotate the crown by manipulating the thumb 232 and index finger 230. Such inputs can be characterized as intentional inputs, because the user intends to interact with crown 108, and provides deliberate crown input accordingly.

Not all inputs received via crown 108 can be characterized as intentional. For example, crown 108 can be inadvertently pushed, pulled, or rotated by the user's hand, wrist, palm, arm, face, or other body parts; or by objects (e.g., table surfaces) in the user's environment. Devices worn on the wrist or arm (e.g., watches, armbands) may be particularly susceptible to such unintentional inputs because these devices are relatively exposed to the user's environment, and may be located near joints (e.g., wrist or elbow joints) that are in frequent motion, even when the user is not actively using the device.

Figure 2B:
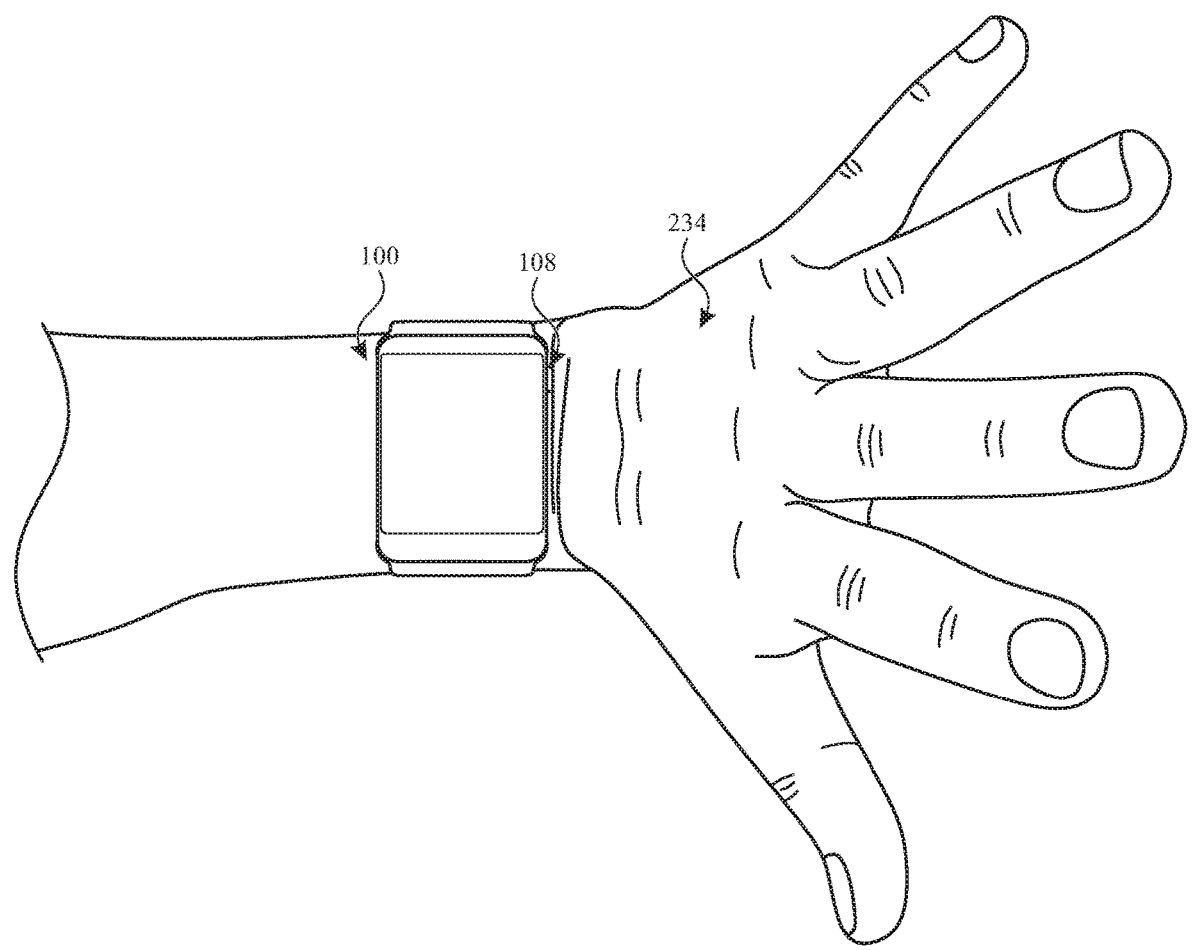
FIGS. 2B and 2C illustrate exemplary unintentional finger inputs provided at an exemplary wearable device according to examples of this disclosure.
Figure 2C:
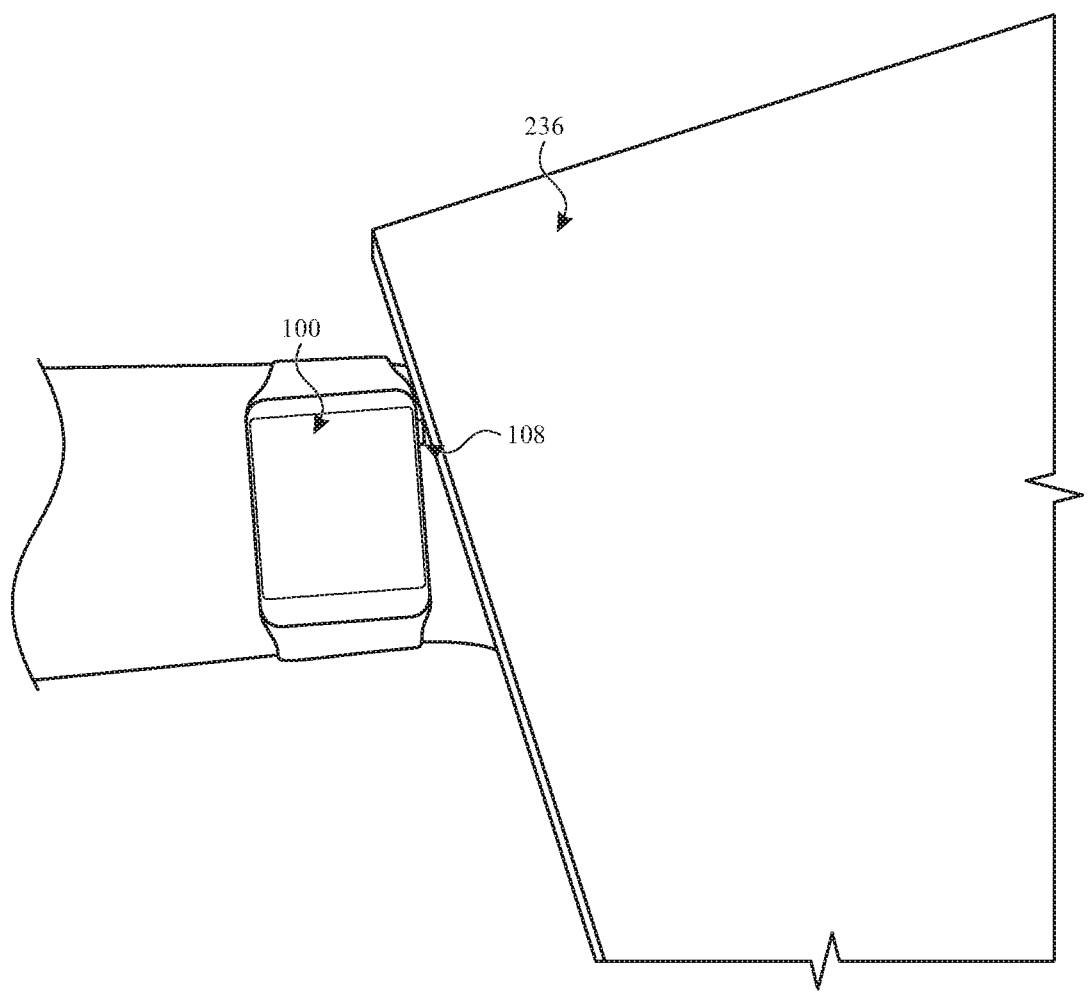

FIGS. 2B and 2C illustrate examples of unintentional input being provided to device 100 according to examples of the disclosure. In the example shown in FIG. 2B, device 100 is a watch worn on a user's wrist, and crown 108 is pushed toward the housing of device 100 as the user's wrist flexes backwards (with the back of the user's hand 234 pressing against crown 108 and providing the pushing motion). In the example shown in FIG. 2C, crown 108 is pushed and/or rotated by a collision with an object in the environment—here, a table surface 236. In the examples of FIGS. 2B and 2C, device 100 may be unable to distinguish the unintentional input provided by hand 234 and table surface 236, respectively, from an intentional input provided by the user (e.g., by the user's fingertips in FIG. 2A). For example, device 100, upon detecting that crown 108 has been pushed, may be unable to determine whether crown 108 was pushed by the user's finger, the user's hand, or some other object. Device 100 may thus be susceptible to false positive inputs, where an unintentional input is mistaken for an intentional one. Even in examples where device 100 may be capable of distinguishing input provided by a user from input provided by a non-user object (e.g., in examples where crown 108 acts as a capacitive touch sensor), device 100 may nonetheless be unable to distinguish intentional input (e.g., from the user's finger) from unintentional input (e.g., from the back of the user's hand). Further, such examples may be unable to distinguish intentional input provided by a gloved finger or stylus from unintentional input provided by a non-user object, such as a table surface.

It can be beneficial for device 100 to distinguish intentional input, such as provided to crown 108 by fingertip 230 in FIG. 2A, from unintentional input, such as provided to crown 108 by hand 234 in FIG. 2B or by table surface 236 in FIG. 2C. The examples described herein refer to the use of one or more proximity sensors to detect an object (e.g., fingertip 230, thumb 232, hand 234, table surface 236, or another object) proximate to device 100. Sensors can include optical sensors; cameras; infrared sensors; acoustic wave sensors; hall effect sensors; or any other suitable sensor or combination of sensors. In some examples, when crown input is detected, output of the sensor can be used as input into a process (e.g., a computer-implemented process executed by a processor of device 100) for determining whether the crown input is an intentional input or an unintentional input. If it is determined that the crown input is an intentional input, the crown input may be processed further (e.g., by software executing on device 100). If it is determined that the crown input is an unintentional input, the crown input may be disregarded, or processed separately from an intentional input. In some examples, described further below, factors such as the size, shape, and proximity to device 100 of a detected object, the duration of the crown input, and a force vector associated with the crown input can be used to determine whether the detected crown input is an intentional input or an unintentional input.

In some examples, sensors for detecting an object proximate to device 100 can be added at specific locations on the outer surface of device 100 (e.g., the area near the top of crown 108 as shown in FIG. 1B). Such sensors can be configured to detect the object's size, shape, and/or proximity to device 100. In some cases, sensors positioned on the outer surface of device 100 (e.g., on the outside of cover glass 112) can be visually obtrusive. Moreover, in some instances, device 100 can have limited space on which to mount sensors in desired locations and orientations. For example, the vertical surface of side surface 103 proximate to the crown can have very limited space above crown 108 to fit proximity sensors. In some examples, such as where device 100 is a watch, the sensors may be positioned within the housing of the watch beneath the cover glass of the watch.

Figure 3A:
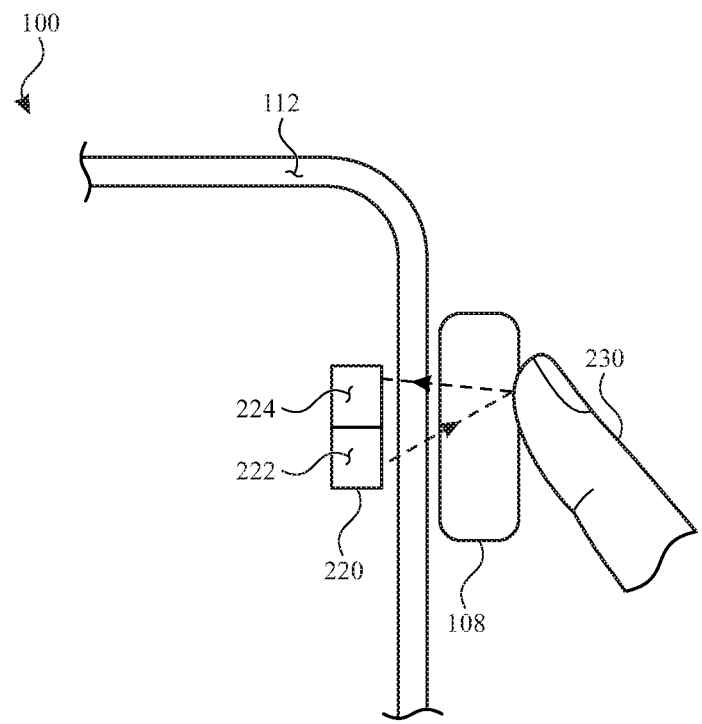
FIGS. 3A and 3B illustrate an exemplary optical proximity sensor according to examples of this disclosure.
Figure 3B:
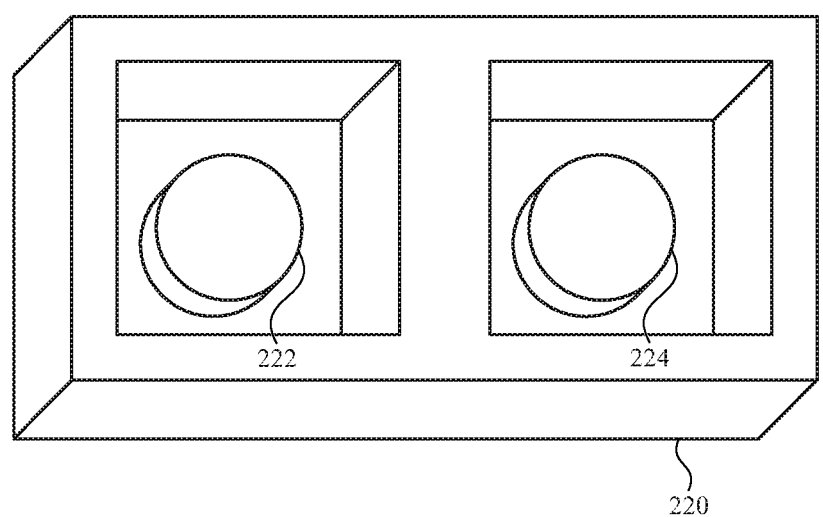

FIG. 3A shows an exemplary optical proximity sensor 220 integrated in a wearable device 100 according to examples of this disclosure. FIG. 3B shows a magnified simplified drawing of the optical proximity sensor according to examples of this disclosure. As shown, proximity sensor 220 can comprise a photo emitter 222 and photodetector 224, though in some cases, proximity sensor can include multiple emitters and/or detectors. Proximity sensor 220 can determine the presence and/or range of an object, such as finger 230, hand 234 (such as shown in FIG. 2B), or table surface 236 (such as shown in FIG. 2C), using any appropriate method. For example, emitter 222 can emit a beam of electromagnetic radiation (e.g., infrared (IR) light), and the presence and/or range of object 230 can be detected based on the amount of radiation received back at detector 224. In some examples, a higher amount of radiation (e.g., light) received back at the detector can correspond to an object at a closer distance, while a lower amount of radiation received back at the detector can correspond to an object at a further distance. In some examples, proximity sensor 220 can detect objects at a distance from the wearable device 100 ranging from 0 mm (i.e., when an object is touching the wearable device) to 100 mm.

In other examples, other methods (e.g., time-of-flight calculations) can be used to detect the presence and/or range of objects. It should be noted that the scope of this disclosure is not limited to the proximity sensors described herein, but can include any optical proximity sensor capable of detecting the presence and/or range of an object according to examples of this disclosure. For example, emitter 222 can, in some examples, emit light of other wavelengths including visible light and ultraviolet light, or can selectively emit light from other wavelengths according to environmental conditions (e.g., characteristics of approaching object, ambient light level, etc.).

Figure 4:
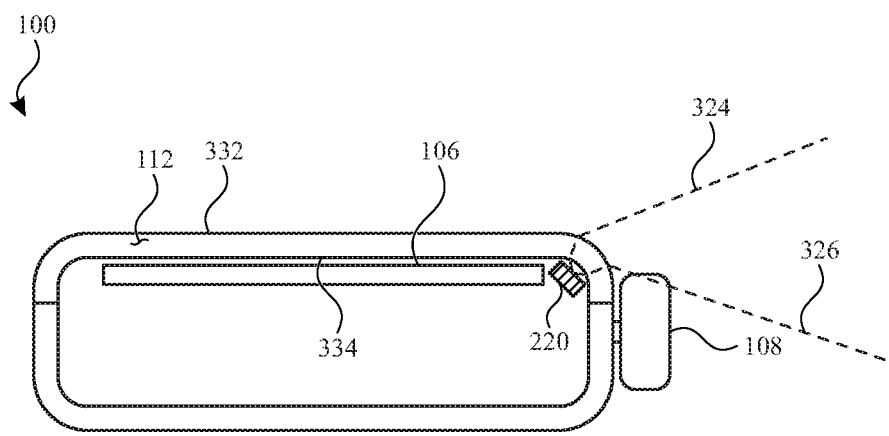
FIG. 4 illustrates a simplified cross-sectional diagram of an exemplary wearable device having an integrated optical proximity sensor according to examples of this disclosure.

In some examples, the proximity sensor can be positioned beneath the cover glass of the wearable device 100. FIG. 4 illustrates a simplified cross-sectional diagram of wearable device 100 having a crown 108 and integrated optical proximity sensor according to examples of this disclosure. Cover glass can have an outer surface 332 and an inner surface 334. In some examples, the field of view of proximity sensor 220 (that is, the path of light emitted and received by the proximity sensor) can be refracted using cover glass 112. In some examples, the characteristics of proximity sensor 220 and cover glass 112 can be selected such that the field of view is focused to a particular region about the wearable device 100, so as to maximize a correlation between objects detected within the region and the presence of an intentional or unintentional crown input, as described below.

In general, the path of a light wave passing across a boundary between two media (e.g., through air and cover glass 112) can be determined using Snell's law of refraction, shown in Equation (1) below:

$$n1 \sin(\alpha) = n2 \sin(\beta) \qquad (1)$$

where n1 is the refractive index of the first medium, n2 is the refractive index of the second medium, α is the angle of incidence (i.e., the entrance angle) of the light, and β is the angle of refraction (i.e., the exit angle) of the light. Although the examples herein describe a path of light being emitted from the proximity sensor 220 through the cover glass 112 and toward an object, such as finger 230, it should be understood that light received at the proximity sensor can follow a similar path. Both the light path of the light emitted by the proximity sensor and light received by the proximity sensor can be described generally as the field of view of the proximity sensor. As shown in FIG. 4, the field of view can be represented as having an upper bound 324 and lower bound 326 (both shown in dashed line). In some examples, the field of view can be centered about a center line, where the center line is refracted through the cover glass at an angle in the range of, e.g., 10 and 60 degrees.

It can be beneficial to define the field of view (e.g., via upper bound 324 and lower bound 326) such that objects indicative of unintentional input—such as hand 234 and table surface 236—are likely to be present within the field of view when unintentional input is received via crown 108. The field of view may be further defined such that objects indicative of intentional input—such as the tip of finger 230—are not likely to be present within the field of view when unintentional input is received via crown 108. Because the detected presence or absence of an object within the field of view may correlate with an unintentional or intentional input, respectively, the detected presence or absence of an object can be used as input into a process for determining whether a detected crown input is an intentional input or an unintentional input.

Figure 5A:
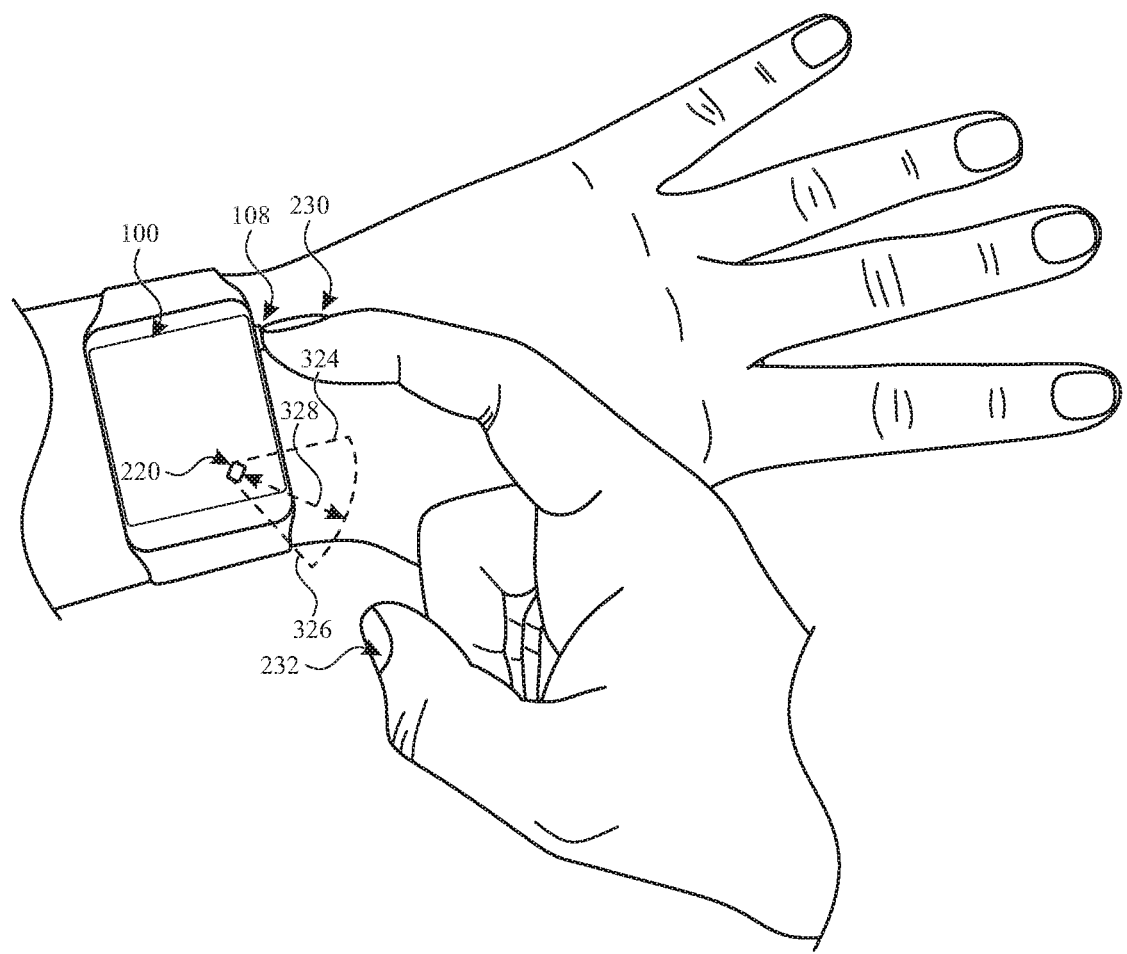
FIG. 5A illustrates an exemplary intentional finger input provided at an exemplary wearable device according to examples of this disclosure.
Figure 5B:
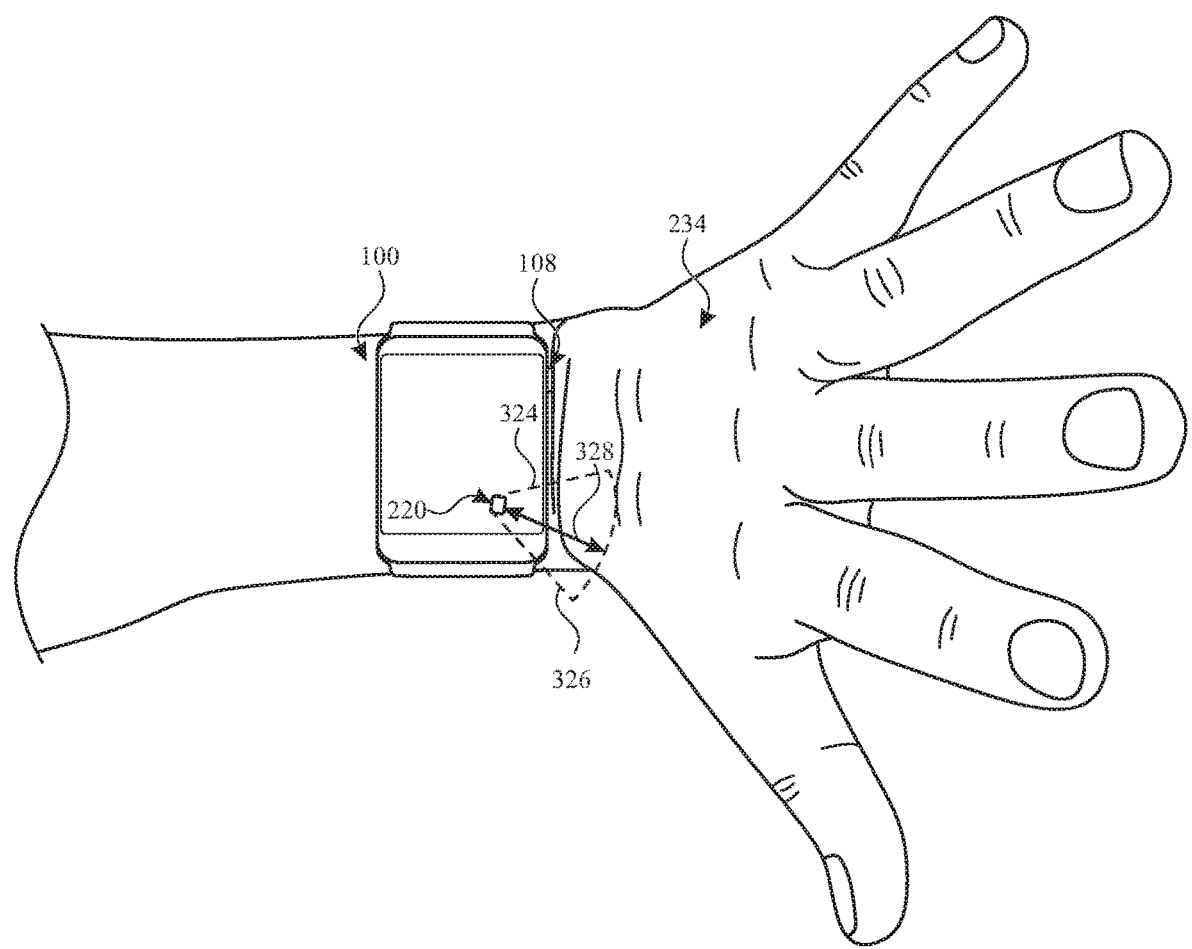
FIGS. 5B and 5C illustrate exemplary unintentional finger inputs provided at an exemplary wearable device according to examples of this disclosure.
Figure 5C:
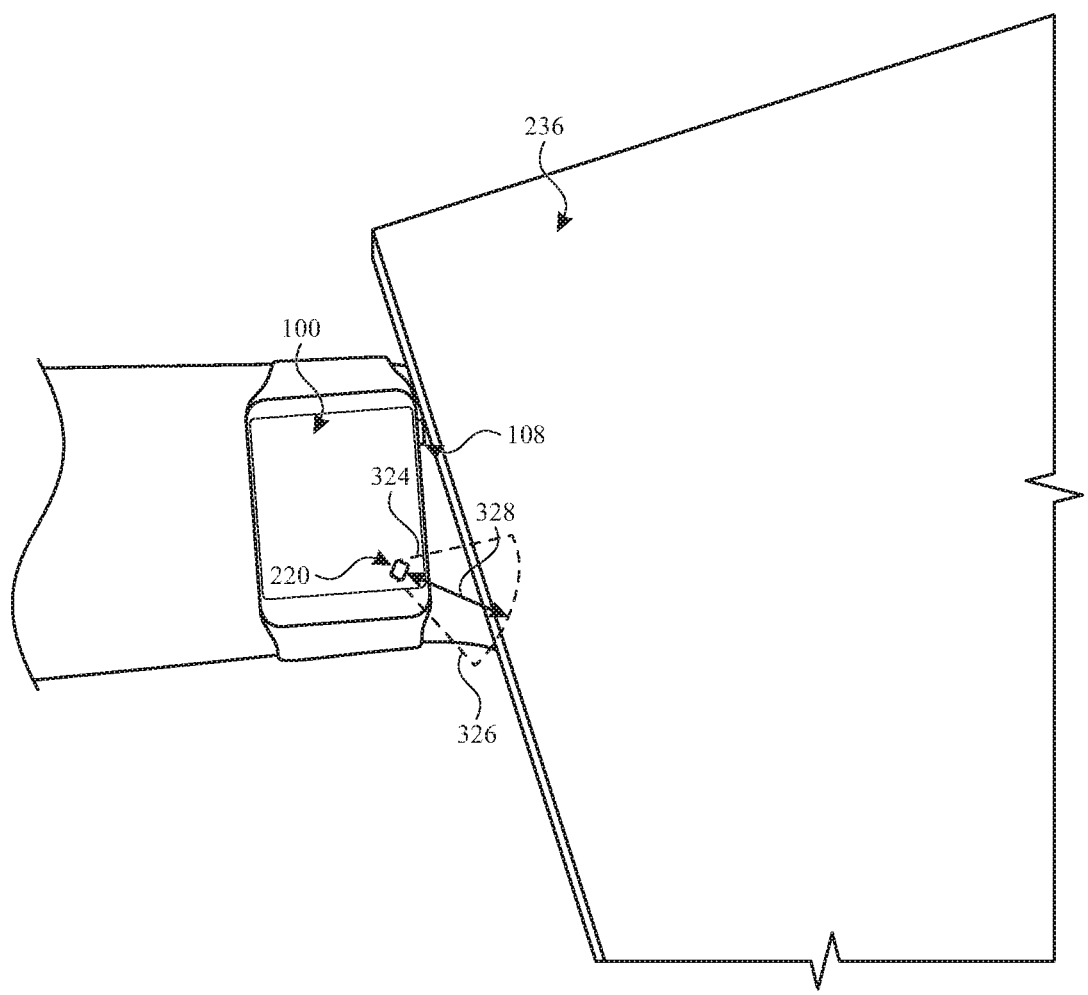

FIGS. 5A-5C illustrate proximity sensor 220 configured to identify unintentional input at device 100 according to examples of the disclosure. FIG. 5A illustrates an example analogous to that shown in FIG. 2A, in which a user provides intentional input to crown 108 via fingertip 230. In the example, while crown 108 receives input (e.g., push input), no objects are detected within a range 328 of proximity sensor 220, within the field of view of proximity sensor 220 (defined by upper bound 324 and lower bound 326). This failure to detect an object indicates a gap between device 100 and any object proximate to proximity sensor 220. Such a gap can be indicative of an intentional input, because when crown input is provided by a finger (e.g., fingertip 230 pushes or rotates crown 108), the finger is typically bent such as shown in FIG. 5A, leaving a gap between the base of the finger and the device 100, so that force can be precisely applied by fingertip 230 to crown 108. In some examples, this gap may be greater than 2-3 millimeters.

FIG. 5B illustrates an example analogous to that shown in FIG. 2B, in which a user's wrist is bent, applying unintentional input to crown 108 via the back of the user's hand 234. In the example, while crown 108 receives input (e.g., push input from the back of hand 234), an object (that is, hand 234) is detected within the range 328 of proximity sensor 220, within the field of view of proximity sensor 220 (defined by upper bound 324 and lower bound 326). In contrast to the example in FIG. 5A, the detection of the object (hand 234) indicates there is little or no gap between device 100 and an object proximate to proximity sensor 220. This absence of a gap can be indicative of an unintentional input, because the absence of such a gap may more commonly result from the presence of wide, blunt objects (e.g., wrists, environmental objects) proximate to device 100, and may less commonly result from fingers applying intentional inputs (such as shown in FIG. 5A).

FIG. 5C illustrates an example analogous to that shown in FIG. 2C, in which a device approaches an environmental object, such as table surface 236, which touches crown 108 and applies unintentional input to the crown. In the example, while crown 108 receives input (e.g., push input from colliding with table surface 236), an object (that is, table surface 236) is detected within the range 328 of proximity sensor 220, within the field of view of proximity sensor 220 (defined by upper bound 324 and lower bound 326). In contrast to the example in FIG. 5A, the detection of the object (hand 234) indicates an insufficient gap between device 100 and an object proximate to proximity sensor 220

(e.g., a gap that is not farther than range 328 from proximity sensor 220, within the field of view of proximity sensor 220). This insufficient gap can be indicative of an unintentional input, because such gaps may more commonly result from the presence of wide, blunt objects (e.g., wrists, environmental objects) proximate to device 100, and may less commonly result from fingers applying intentional inputs (such as shown in FIG. 5A). Further, in examples where a size and/or shape of the object can be detected—for example, where sensor 220 is configured to detect a contour of a nearby object—certain detected sizes and/or shapes (e.g., large flat surfaces) can correlate to the presence of environmental objects. For example, if a nearby object is detected to have a flat edge, that flat edge can indicate that the object is likely a man-made object, rather than a body part, and may thus correlate to an unintentional input.

As described above with respect to FIGS. 5A-5C, the presence or absence of a gap between device 100 and a detected object, such as detected by proximity sensor 220, when presented alongside a detected crown input, is information correlated with whether the detected crown input is an intentional input or an unintentional input. It is beneficial to configure proximity sensor 220 to maximize this correlation, so as to reduce the prevalence of false positive inputs (i.e., an unintentional inputs mistaken for intentional inputs) and false negative inputs (i.e., an intentional inputs mistaken for unintentional inputs). In some examples, the correlation can be maximized by determining various parameters of proximity sensor 220 and/or device 100, such as boundaries for the field of view of proximity sensor 220; a direction in which the sensor is directed; and the distance from the sensor (e.g., range 328) at which an object will be detected.

Figure 6:
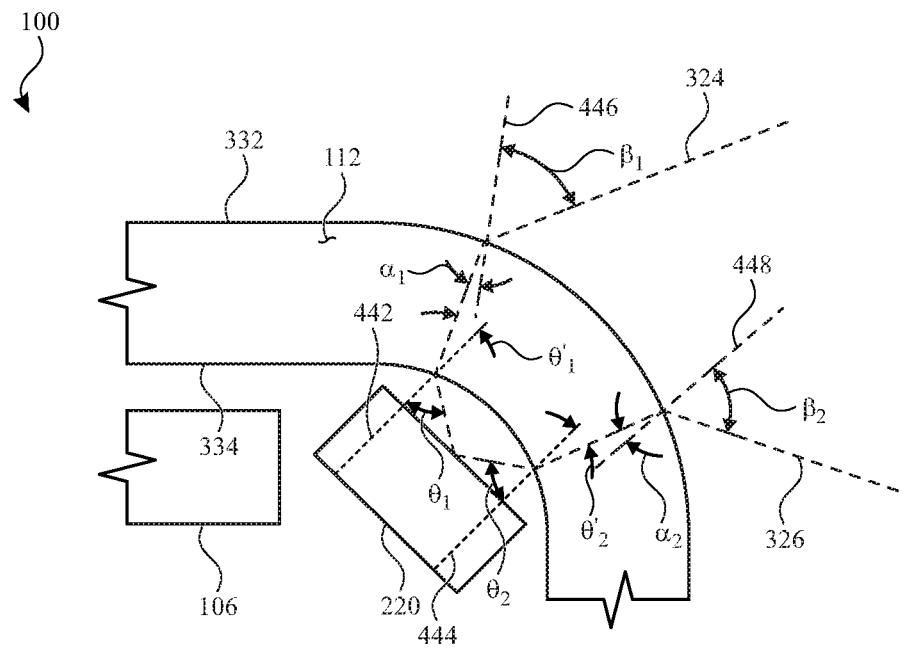
FIG. 6 illustrates a proximity sensor configured to identify unintentional input at an exemplary wearable device according to examples of the disclosure.

FIG. 6 illustrates a proximity sensor 220 configured to identify unintentional input at device 100 according to examples of the disclosure. The example shows a magnified view of the curved portion of cover glass 112 (having a refractive index n) including a curved inner surface 334, a curved outer surface 332, and proximity sensor 220 mounted to the inner surface of the cover glass 112. In other examples, proximity sensor 220 need not be mounted to cover glass 112, but can be mounted to some other component within the housing and cover glass 112 of the device. The initial field of view of proximity sensor 220 (e.g., the field of view beneath the inner surface of cover glass 112) shown in FIG. 6 is defined by an upper bound beneath the cover glass having an angle $\theta_1$ and a lower bound beneath the cover glass having an angle $\theta_2$. Further, as shown in FIG. 4 and described below, proximity sensor 220 is associated with exit angles $\beta_1$ and $\beta_2$ and internal angles $\theta_1'$ and $\theta_2'$.

As described above, it can be beneficial to select parameters associated with proximity sensor 220 and device 100 so as to maximize the correlation between the detected presence or absence of a gap adjacent proximity sensor 220, and the presentation of an intentional or unintentional input. For example, exit angles $\beta_1$ and $\beta_2$ can be determined such that objects indicative of unintentional input are likely to fall within a region defined by angles $\beta_1$ and $\beta_2$; and such that objects indicative of intentional input are not likely to fall within the region. As described below, desired exit angles $\beta_1$ and $\beta_2$ can be implemented by selecting particular values for, e.g., initial angles $\theta_1$ and $\theta_2$, refractive index n, and the curvature and dimensions of cover glass 112.

As shown in FIG. 6, angles $\theta_1$ and $\theta_2$ are expressed with respect to normal lines 442 and 444 (shown in dotted line) perpendicular to the boundary at the inner surface. The characteristics of proximity sensor 220 (such as focal length and lens shape), can be selected to produce the desired angles $\theta_1$ and $\theta_2$. As shown, the light path of the upper bound beneath the cover glass and lower bound beneath the cover glass can change as the light path enters the cover glass 112 at the boundary of the inner surface 334. In FIG. 6 the angles of the light path as it enters the cover glass are represented for the upper and lower bounds as $\theta_1'$ and $\theta_2'$ respectively. As indicated in Equation (1), the refractive index n of cover glass 112 can define, at least in part, angles $\theta_1'$ and $\theta_2'$. Using Equation (1) to solve for β and substituting variables for those at hand, θ' (e.g., $\theta_1'$ or $\theta_2'$ as illustrated in FIG. 6) can be represented as shown in Equation (2) below:

$$\theta' = \sin^{-1}\left(\frac{n_{AIR}}{n_{GLASS}} \times \sin(\theta)\right) \quad (2)$$

One skilled in the art would understand that the refractive index $n_{GLASS}$ of the cover glass and the distance and angle at which proximity sensor 220 is positioned with respect to the inner surface of cover glass 112 can be selected to achieve a desired light path within cover glass 112. In some examples, angles θ and θ' can be the same, that is, the upper and lower bounds can be symmetric within the cover glass. For example, the upper and lower bounds may be symmetric when the proximity sensor 220 is mounted parallel to the inner surface 334.

The light path of the upper bound 324 and lower bound 326 within cover glass 112 can be refracted at the boundary between the outer surface of the cover glass 112 and air. As shown in FIG. 6, angles $\beta_1$ and $\beta_2$ can represent the exit angles where the upper and lower bounds of the light path (324 and 326) exit cover glass 112. As shown, angles $\beta_1$ and $\beta_2$ are expressed with respect to the normal lines 446 and 448 perpendicular to the boundary at the upper and lower bounds 324 and 326, respectively. As indicated in Equation (1), the refractive index $n_{GLASS}$ of cover glass 112 can define, at least in part, angles $\beta_1$ and $\beta_2$. Using Equation (1) to solve for β and substituting variables for those at hand, $\beta_1$ or $\beta_2$ as illustrated in FIG. 6 can be represented as shown in Equation (3) below:

$$\beta = \sin^{-1}\left(\frac{n_{GLASS}}{n_{AIR}} \times \sin(\alpha)\right) \quad (3)$$

Returning again to FIG. 4, the characteristics of proximity sensor 220 and cover glass 112 can be selected such that the field of view is focused to a particular region about the wearable device 100 such as the area above crown 108. As discussed above, the refractivity of the cover glass material can be selected in order to achieve desired angles $\theta_1'$, $\theta_2'$, $\beta_1$ and $\beta_2$ as shown in FIG. 4. In addition, the curvature of the inner surface 334 of cover glass 112 can be selected to achieve desired angles $\theta_1'$ and $\theta_2'$. Likewise, the curvature of the outer surface 332 of cover glass 112 can be also selected to achieve desired angles $\beta_1$ and $\beta_2$. In addition, the thickness of cover glass 112 can be selected to produce desired results. Although the cover glass has been described herein as comprising a single material for convenience, it should be understood that cover glass 112 can comprise multiple materials, including configurations wherein cover glass comprises layers of materials. In such configurations, the light path of proximity sensor 220 can undergo multiple refractions at the boundaries between each material. Accordingly, in configurations where cover glass 112 comprises multiple layers of materials, the refraction index of one or more of the materials can be selected to achieve a desired field of view for the proximity sensor. It should be noted that, in addition to the above-mentioned approaches, the field of view of proximity sensor 220 can be further defined using other well-known techniques including, but not limited to, utilizing additional lenses, prisms, or mirrors.

As illustrated in FIG. 4, in some examples, the field of view defined by bounds 324-326 of proximity sensor 220 can extend to an area not normal to the proximity sensor. In some cases, the field of view of proximity sensor 220 can extend to next to the device 100. That is, the field of view can include an area adjacent to the device in a direction parallel to the plane of the touchscreen 106. In some examples, the field of view can extend to an area next to crown 108 in a direction parallel to the plane of touchscreen 106. In some examples, the field of view can include an area proximate to device 100 at an angle with respect to the plane of touchscreen 106, wherein the angle can be in a range of 10 to 80 degrees. Such areas can be beneficially selected such that objects associated with unintentional input (e.g., hand 234 and table surface 236) are likely to fall within the area when unintentional crown input is presented; and such that objects associated with intentional input (e.g., fingertip 230) are unlikely to fall within the area when intentional crown input is presented.

Figure 7:
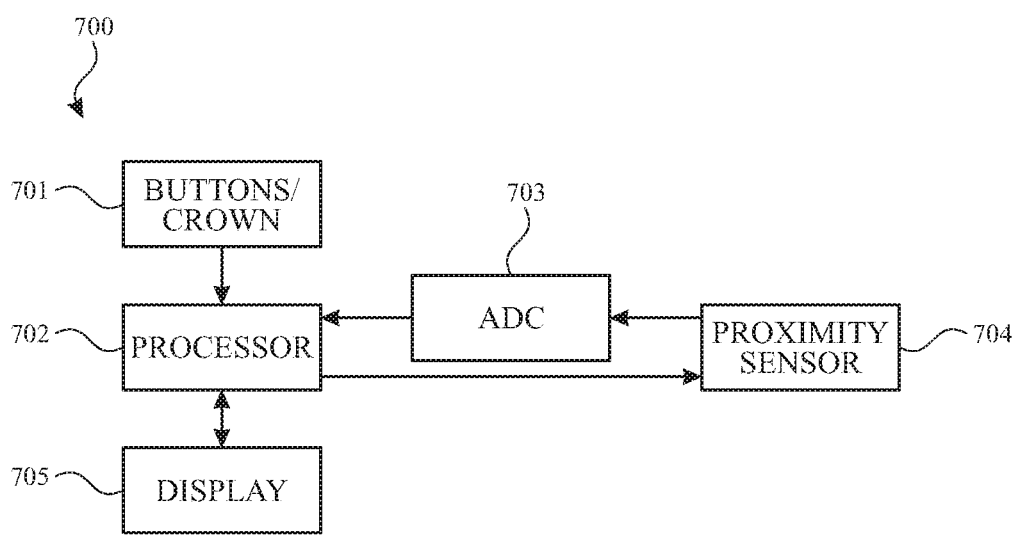
FIG. 7 illustrates a simplified block diagram of an exemplary wearable device according to examples of this disclosure.

FIG. 7 illustrates a simplified block diagram 700 of wearable device 100 according to examples of this disclosure. As shown, device 100 can include input mechanisms 701, which can include one or more buttons and crown. Device 100 may also include a touchscreen 705, a proximity sensor 704, and an analog-to-digital converter (ADC) 703. A processor 702 may also be included in the wearable device 100 and be configured to execute algorithms for carrying out the various methods described herein and control the reception and manipulation of input and output data between components of wearable device, e.g., the buttons, crown, display, and emitters and receivers of proximity sensor 704. The processor can be a single-chip processor or can be implemented with multiple components. It should be understood that the scope of this disclosure is not limited to the components and configuration of FIG. 7, but can include other or additional components in multiple configurations. For example, any suitable sensor or combination of sensors (e.g., optical, magnetic, acoustic, infrared, ultrasonic, etc.) may be used to detect the presence of objects in proximity to device 100.

Methods for detecting the presence of an object proximate to the crown of a watch are further disclosed herein. In some variations, the methods generally include detecting the presence of an object proximate to the device. In some configurations, the device can detect objects as far as 100 mm from the wearable device. In some configurations, the device can execute one or more operations based on the detection of the presence of an object, or on the lack thereof.

Figure 8:
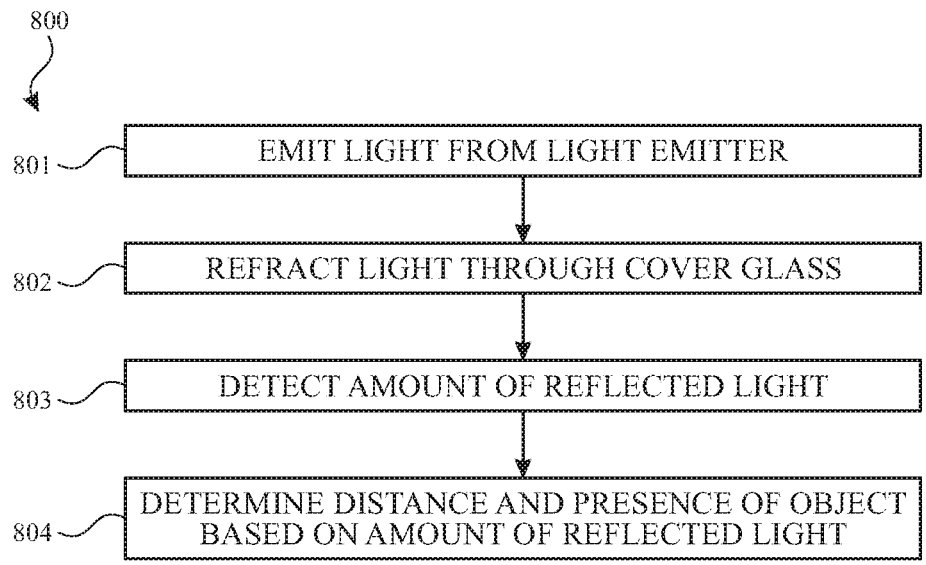
FIG. 8 illustrates an exemplary process for detecting the presence of an object proximate to an exemplary wearable device according to examples of this disclosure.

FIG. 8 illustrates an exemplary process 800 for detecting the presence of an object proximate to the device according to examples of this disclosure. At block 801, the device can emit light from a light emitter. At block 802, the light can be refracted through a cover glass such as described above with reference to FIG. 6. At block 803 a photodetector can detect the amount of the emitted light which is reflected back from the emitted light. This amount can be represented as a value. At block 804, the presence (and in some examples, the distance) of an object can be detected based on the value representing the amount of emitted light which is reflected back. In some examples, a processor can be configured to operate the proximity sensor according to various light-pulsing (i.e., luminous modulation) schemes. For example, referring back to FIG. 7, in some configurations, the processor 702 can be configured in conjunction with proximity sensor 704 to pulse and detect light at a frequency less likely to match to the pulse frequency of ambient light (e.g., 120 Hz, which matches the flicker of conventional fluorescent lamps). In some configurations, processor 702 can be configured in conjunction with proximity sensor 704 to emit and detect light at changing pulse frequencies, i.e., according to a pulse-frequency hopping scheme.

In some configurations, the device can execute one or more operations based on the detection of the presence of an object, or on the lack thereof. Referring back to FIGS. 5A-5C, in some examples, device 100 can determine the distance between an object (e.g., objects 230, 232, 234, or 236) and proximity sensor 220, including determining whether the object is within a range (e.g., range 328) of the sensor and falls within a field of view of the sensor. Moreover, in some configurations, device 100 can determine when an object is approaching proximity sensor 220 (i.e., when the distance between the object and the sensor decreases during two successive times) and when an object is traveling away from the sensor (i.e., when the distance between the object and the sensor decreases during two successive times). Further, in some configurations, device 100 can determine when an object (e.g., finger 230) is approaching crown 108 (i.e., when the distance between the object and the crown decreases during two successive times) and when the object is traveling away from crown 108 (i.e., when the distance between the object and the crown decreases during two successive times). In some examples, different operations can be performed based on whether an object is not touching the crown (e.g., approaching the crown or distancing itself from the crown) or touching the crown. In some configurations, the determination can be performed in conjunction with a touch-sensor on crown 108 itself (e.g., a capacitive touch sensor).

Figure 9:
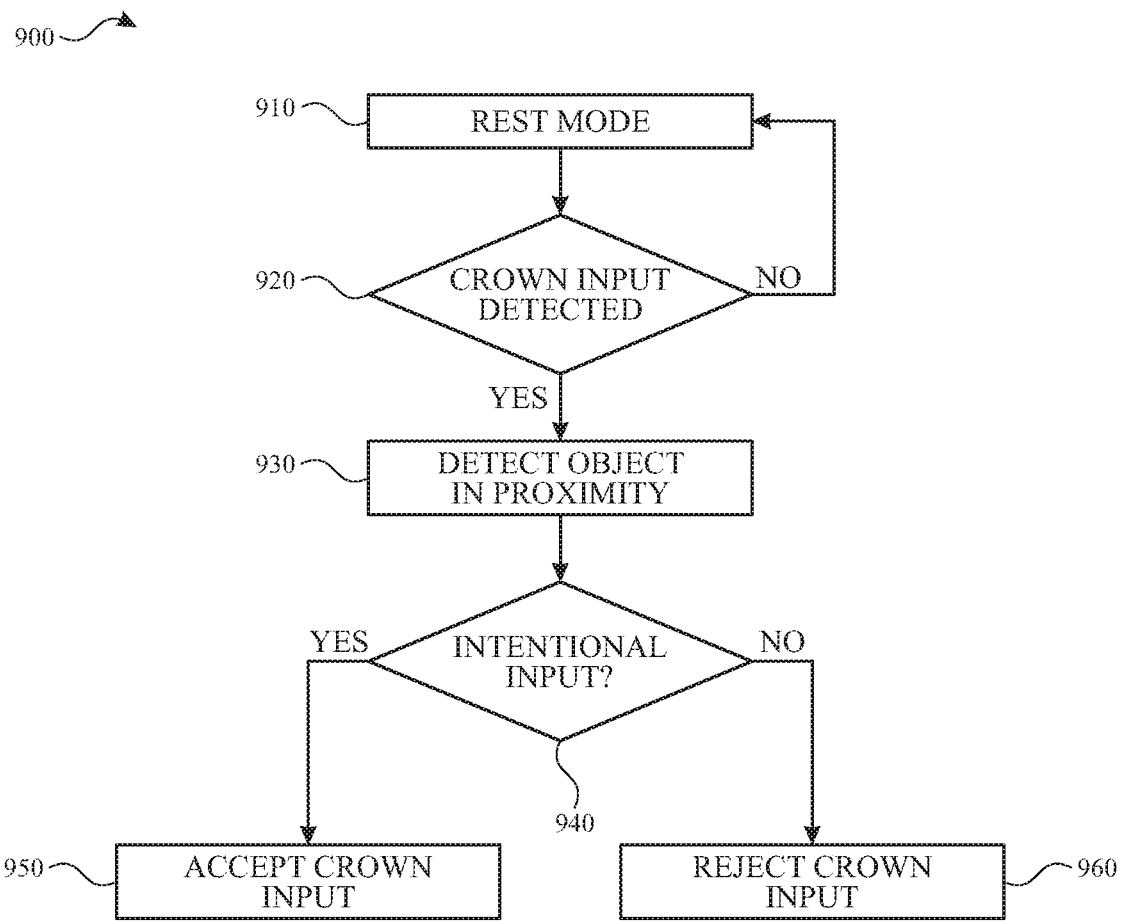
FIG. 9 illustrates an exemplary process for performing operations according to examples of this disclosure.

FIG. 9 illustrates an exemplary process 900 for performing the operations described above according to examples of this disclosure. At stage 910, the device can be in a rest mode. This may correspond, for example, to a power-saving mode in which the device display is powered down. In some examples, the rest mode can correspond to a device mode where the display is operative, but the device is not performing an operation (e.g., a touch or hover operation). In some examples, the device can exit the rest mode upon receiving intentional input. At stage 920, device can query whether crown input has been received. Crown input can include one or more of a push input (which may be, e.g., in a direction facing into the device, or in a direction not normal to a surface of the device); a pull input; a rotation input; or other suitable inputs. In some examples, crown input can include a force vector indicating a magnitude and direction of the input (e.g., as provided by a force sensor configured to detect a force applied to the crown). If crown input has been received, processing proceeds to stage 930; if no crown input has been received, the device remains in rest mode.

At stage 930, the device can query whether an object exists in proximity to the device, for example using a proximity sensor (e.g., proximity sensor 220) as described above. For instance, the device can evaluate the sensor output to determine whether an object exists within a field of view of the sensor, and at a distance from the sensor that is less than or equal to a range (e.g., range 328) of the sensor. Range 328 may be adjusted to determine a sensitivity of the object detection; a shorter value for the range may result in objects more frequently being detected in proximity to the device, and vice versa. In some examples, objects detected at a distance further than a threshold distance may be disregarded. Parameters affecting the field of view of the sensor may be adjusted as described above to obtain a desired size and direction of the field of view. In some examples, the sensor may output a value corresponding to the distance of the object from the sensor. In some examples, the sensor may output a binary value corresponding to whether or not an object exists in proximity to the sensor. In some examples, more than one sensor may be used to determine whether an object exists in proximity to the device.

At stage 940, the device can determine, using the results of stage 930, whether the crown input detected at stage 920 is more likely to correspond to an intentional input or to an unintentional input. As described above, the presence of an object proximate to the device can be correlated with an unintentional crown input, at least because users may tend to interact with the crown in such a way that a gap exists between the user's hand and a portion of the device. In some examples, the device can reach a determination at stage 940 based solely on the presence of such an object. That is, in such examples, if an object is detected proximate to the device, the crown input detected at stage 920 is more likely to be an unintentional input than an intentional input; and, conversely, if no object is detected proximate to the device, the crown input is more likely to be an intentional input than an unintentional input.

In some examples, the determination at stage 940 may be based on other information other than the mere presence or absence of an object in proximity to the device. In some examples, this can include generating a confidence score corresponding to a degree of confidence that the crown input corresponds to an intentional (or unintentional) input, and comparing the confidence score to a threshold value to determine whether the crown input is more likely to correspond to an intentional input or to an unintentional input. For instance, if the confidence score represents a confidence that the crown input corresponds to an unintentional input, and the confidence score exceeds the threshold value, it could be determined at stage 940 that the crown input corresponds to an unintentional input. Generating the confidence score can include assigning a weight to each of one or more factors indicative of an intentional or unintentional input; determining a value associated with each of those factors; weighting that value; and summing the weighted values to obtain the confidence score. A weight for a particular factor can be determined based on how strongly that factor correlates with an intentional or unintentional input. For example, if the presence of an object near the device is strongly correlated with an unintentional input, that factor may be assigned a relatively high (e.g., highly positive or highly negative) weight. Conversely, if the strength of a push input is only weakly correlated with an unintentional input, that factor may be assigned a relatively low weight.

One such factor can include not merely whether an object is proximate to the device, but also the position and/or orientation of the object relative to the device. For example, if an object is proximate to the device, the device may detect, via the proximity sensor, the distance between the object and the device. Because a shorter distance between the object and the device may more strongly correlate with an unintentional input—for instance, in a situation where the user's wrist is bent, inadvertently pressing the back of the user's hand against the device—a shorter distance may increase a confidence that the crown input is an unintentional input.

Another such factor can include an orientation of the device. For example, if the device is a watch, users may tend to provide crown input while the device is relatively horizontal (i.e., perpendicular to a gravity vector) and facing upwards (i.e., opposite the gravity vector). In some examples, the device can include a sensor (e.g., an accelerometer, gyroscope, or inertial measurement unit) configured to output an orientation of the device. If the device is oriented such that it is not horizontal—for example, if the device is inverted, or tilted vertically—that orientation may be correlated with an unintentional input. For instance, the device may be oriented vertically while the user engages in physical activity (e.g., pushups) that accidentally depresses the crown. Accordingly, a deviation of the device orientation from a horizontal and upward-facing orientation may increase a confidence that the crown input is an unintentional input.

Another factor can include a vector associated with the crown input detected at stage 920. For instance, some examples may include a crown configured to detect a push input having a magnitude and a direction. A direction vector pointing toward the device (i.e. normal to an edge of the device along which the crown is positioned) may correlate to an intentional input. This is because when a user intentionally pushes the crown, the push may be directed toward the device itself; but when a user intentionally pushes the crown, such as by inadvertently pressing the crown against a surface, the direction of the push vector may be less likely to face the device; that is, the vector may be more likely to include a component not directed toward the device.

Similarly, the magnitude of the push vector can be correlated with an intentional or unintentional input. When providing intentional crown input, users may tend to push the crown with a predictable amount of force—sufficient to cause the input to register with the device, but not so strong as to cause discomfort or to damage the device or the crown. If the magnitude of the push vector falls within an expected range of such force, that can be correlated with an intentional input. Conversely, if the magnitude of the push vector corresponds to an unusually large amount of force, that can be correlated with an unintentional input (e.g., the user accidentally sitting on the crown). Similarly, if the magnitude of the push vector corresponds to an unusually small amount of force, that can also be correlated with an unintentional input (e.g., the crown is resting against an object in the user's environment).

Figure 10A:
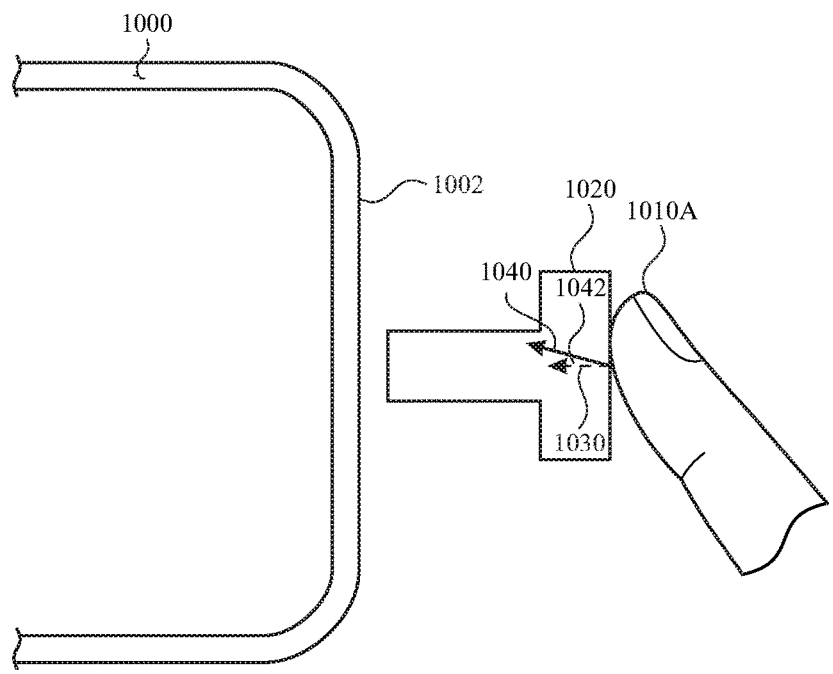
FIGS. 10A-10B illustrate example finger input vectors provided to an exemplary wearable device according to examples of this disclosure.
Figure 10B:
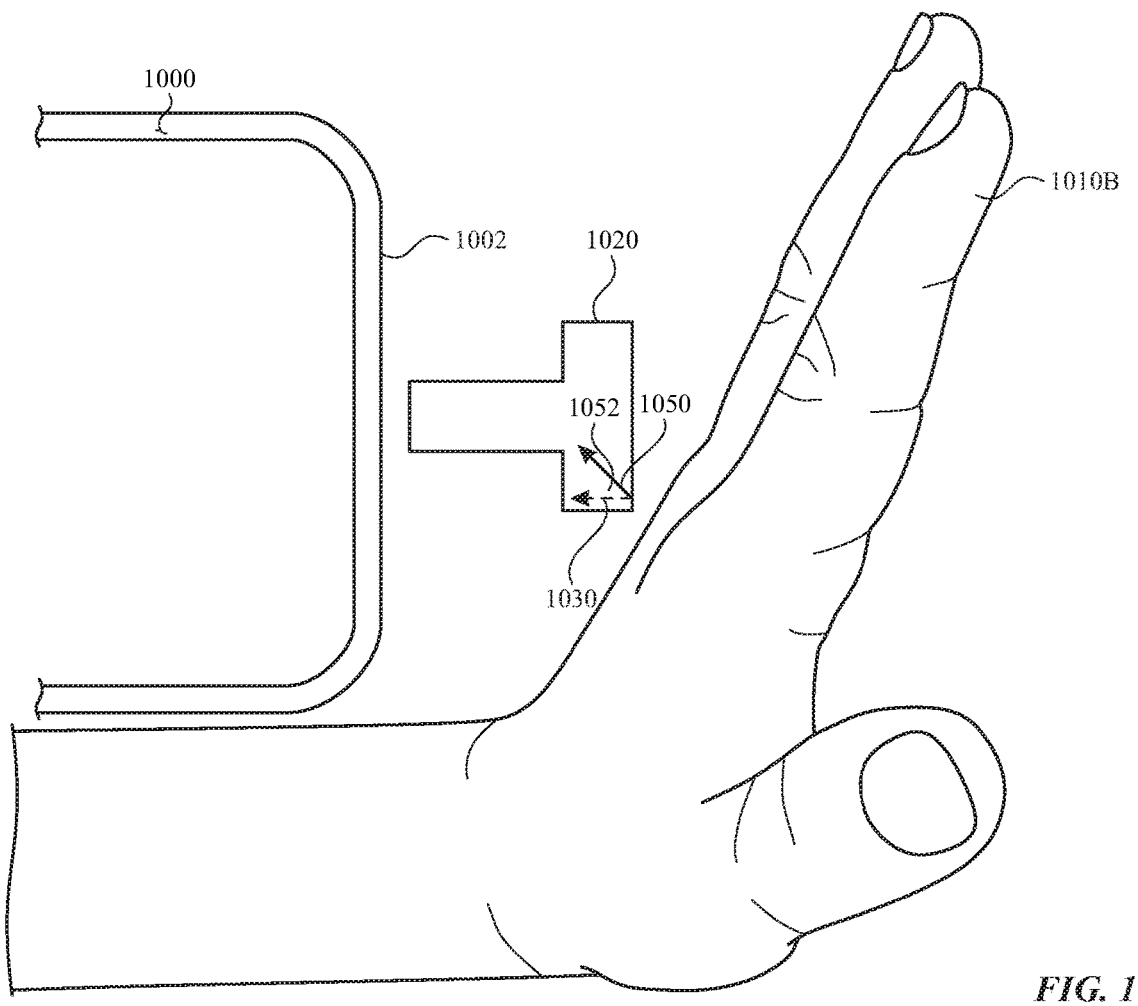

FIGS. 10A and 10B illustrate example force vectors 1040 and 1050, which may be applied to crown 1020 (which may correspond to crown 108) of a wearable device 1000 (which may correspond to device 100) by object 1010A (which may correspond to finger 230) or 1010B (which may correspond to the back of the user's hand 234). In the example shown in FIG. 10A, object 1010A applies force vector 1040 at a first magnitude, and at an angle 1042 with respect to a normal 1030 to a surface 1002 of the device 1000. A small value of angle 1042 may indicate that object 1010A is applying an intentional input, as described above; that is, as shown in the figure, a small value of angle 1042 may indicate a force vector applied largely along the normal 1030, which may indicate that the user is deliberately pushing the crown 1020 into the device 1000. In addition, a magnitude of force vector 1040 that falls within an expected range can indicate that object 1010A is applying an intentional input; if the magnitude is smaller than the minimum of the expected range, it may indicate that the crown is being pressed only lightly, which may correspond to an unintentional input (e.g., the crown being brushed against an object in the user's environment). Conversely, if the magnitude is larger than the maximum of the expected range, it may indicate that the crown is being unintentionally pushed by an object 1010A other than a user's finger (e.g., the user may be sitting on the crown).

In the example shown in FIG. 10B, object 1010B applies force vector 1050 at a second magnitude, and at an angle 1052 with respect to the normal 1030. In FIG. 10B, angle 1052 is greater than angle 1042 of FIG. 10A. This greater angle can indicate that object 1010B is applying an unintentional input, as described above; that is, as shown in the figure, a large value of angle 1052 may indicate a force vector applied largely orthogonally to the normal 1030, which may indicate that the user did not intend to push the crown 1020 into the device 1000. (This may correspond, for example, to the example shown in FIG. 2C, in which crown 108 is inadvertently pressed against a table surface 236.) As described above with respect to FIG. 10A, the magnitude of force vector 1050 can be compared to an expected range to indicate whether the force vector corresponds to an intentional input or an unintentional input.

In some examples, a cross product of a force vector and a normal vector can be compared to an expected range to determine whether the force vector corresponds to an intentional input or an unintentional input. For example, with respect to FIG. 10A, the cross product of force vector 1040 and normal vector 1030—that is, the magnitude of force vector 1040, times the magnitude of normal vector 1030 (in some examples, a unit magnitude), times the cosine of angle 1042—indicates an extent to which force vector 1040 points in the direction of normal vector 1030. Because intentional inputs can be expected to be directed primarily in the direction of a normal to a surface of the device, and because magnitudes of intentional inputs can be expected to fall within a known range, the cross product may be compared to a range of expected values (e.g., as described above with respect to the magnitude of force vector 1040) to indicate whether the force vector 1040 corresponds to an intentional input or an unintentional input. A similar computation could apply equally to force vector 1050, normal vector 1030, and angle 1052 shown in FIG. 10B.

The change in the magnitude and/or direction of the push vector (e.g., force vectors 1040 or 1050), or in the cross product of the push vector with respect to a normal vector, over time, is another factor that can be correlated with an intentional or unintentional input. As above, when providing intentional crown input, users may tend to push the crown with not only a predictable amount of force, but with a predictable profile of force as a function of time. For example, the force of the push vector (e.g., the magnitude of force vectors 1040 or 1050, and/or the cross products of those force vectors with normal vector 1030) may increase from zero to its maximum force over a relatively consistent length of time. A push vector that reaches its maximum force in roughly that amount of time may be correlated with an intentional input. Conversely, a push vector that takes an unusually long or short amount of time to reach its maximum force may be correlated with an unintentional input. For instance, a short amount of time might correspond to the crown violently (and accidentally) colliding with an object in the user's environment; while a long amount of time might correspond to the device slowly (and accidentally) shifting into an awkward or unusual position.

Similarly, a changing direction of the push vector (e.g., force vectors 1040 or 1050) is another factor that can be correlated with an intentional or unintentional input. When providing intentional crown input, users may tend to push the crown in a relatively constant direction (e.g., into the device). If the direction of the push vector remains constant, this fact can be correlated with an intentional input. Conversely, if the direction of the push vector changes while a push is being applied, this can correlate to an unintentional input, such as where the crown is accidentally depressed while the device is being moved or rotated.

Duration of a crown input is another factor that can be correlated with an intentional or unintentional input. When providing intentional crown input, users may tend to apply the input for a consistent or predictable amount of time (e.g., 100-200 milliseconds). If the duration of a crown input is roughly the length of this typical amount of time, that fact may correlate with an intentional input. Conversely, if the duration of the crown input is significantly longer or shorter than that typical amount of time, that fact may correlate with an unintentional input. For instance, an unusually long crown input (e.g., an input lasting several seconds) may correspond to the crown being inadvertently pressed against an object, and remaining in such a position that the crown continues to remain depressed. And an unusually short crown input can correspond to the crown being accidentally grazed against an object in the user's environment. (However, in some examples, a device may be configured to differentiate between input commands based on the duration of a crown input; for instance, a press-and-hold input may result in a different action than a simple press input. In such examples, extra steps may be required to differentiate between a long crown input that results from an unintentional input, and a long crown input that results from an intentional input intended to provide a press-and-hold command.)

Another factor that can be correlated with intentional or unintentional input is the rate at which a detected object approaches the device. As described above, in some examples, a proximity sensor of the device can be configured to detect the rate at which an object approaches the device. When providing intentional crown input, users may approach the device with their fingers at a consistent or predictable rate. If an object is detected approaching the device at a rate that is similar to that predictable rate, that fact may correlate with an intentional input (e.g., the user's finger approaching the crown to provide input). Conversely, if an object is detected approaching the device at a rate that is significantly faster or slower than that predictable rate, that fact may correlate with an unintentional input (e.g., the device may be about to accidentally collide with an object in the user's environment).

Another factor that can be correlated with intentional or unintentional input is a detected size and/or shape of an object detected proximate to the device. As described above, in some examples, a proximity sensor of the device can be configured to detect a and/or shape (e.g., the presence of a large flat edge) of a nearby object. When providing intentional crown input, users will typically touch the crown with their fingers. Detected objects that are not shaped like hands or fingers—for example, objects that are large or that include flat edges, such as those belonging to manufactured items—can correlate with unintentional input, such as may result from the crown accidentally pressing against an object in the environment, like a flat surface of a table (e.g., table surface 236 described above).

For one or more of the above factors, values that correlate with intentional or unintentional input may be relatively consistent across users of a device. Values of such factors that correlate with intentional input, for example, could be determined by measuring intentional inputs provided by a representative sample of users; and, based on the measurements, determining optimal values, or ranges of values, that will result in predictable or consistent determinations (e.g., at stage 940) across most users of the device. For some factors, values that correlate with intentional or unintentional input may vary significantly between users, but may remain relatively consistent with respect to a single user. For example, a first user may typically provide push input by pressing the crown for 100-150 milliseconds, while a second user may typically provide push input by pressing the crown for 200-250 milliseconds. Similarly, a first user may typically provide push input having a force in the range of 2-7 Newtons, while a second user may typically provide push input having a force in the range of 5-10 Newtons. In some examples, it may be desirable to determine and apply such values on a per-user, or per-group (e.g., children, adults, senior citizens) basis. In some such examples, optimal values for an individual user can be determined using a calibration procedure, such as in which the user is asked to provide representative samples of crown input, and in which the parameters of those input samples are used to determine which values for that user correspond to intentional crown input. In some examples, optimal values for a user can be learned over time, such as by refining an initial value based on subsequent measurements taken as the user provides crown input during ordinary usage of the device.

It should be noted that although the examples of the disclosure are described with respect to pushing the crown, analogous principles apply to other types of crown input, such as pulling and rotation, as well as to multiple simultaneous inputs (e.g., pushing while rotating).

If, at stage 940, the device determines that the crown input is more likely an intentional input, the device proceeds to stage 950, where the crown input detected at stage 920 is accepted—that is, the crown input is processed by the device. For example, if the crown input is a rotation of the crown, processing the crown input may include performing a scrolling operation corresponding to the rotation. Similarly, if the crown input is a push of the crown, processing the crown input may include performing a selection operation corresponding to the push. The nature of processing the crown input may depend on one or more processes being executed by the device. In some examples, crown input may be provisionally accepted when received at stage 920; and then "confirmed" or finalized at stage 950, once it has been determined that the input should be accepted. (This may be beneficial to reduce the latency between receiving and responding to crown input.) In some examples, the device may exit the rest mode upon reaching stage 950.

If, at stage 940, the device determines that the crown input is more likely an unintentional input, the device proceeds to stage 960. At stage 960, the crown input detected at stage 920 is rejected. In some examples, rejecting the crown input includes disregarding the crown input entirely. In some examples, rejecting the crown input includes generating a response (e.g., a user notification); logging the event; or performing some other action other than processing the crown input as an intentional crown input. In some examples, crown input may be provisionally accepted when received at stage 920; but then backed out at stage 960, once it has been determined that the input should be rejected. (This may be beneficial to reduce the latency between receiving and responding to crown input.) In some examples, the device may remain in rest mode upon reaching stage 960 (and may return operation to stage 910). In this manner, power usage by the device can be conserved by not exiting rest mode in response to unintentional crown inputs, such as determined at stage 940.

Although examples described herein primarily involve proximity sensors used to detect objects near the crown of a watch, it should be understood that the proximity sensors described herein can be used to detect the presence of objects at any location proximate to the edge of a device. For example, referring back to FIG. 1A, proximity sensors can be positioned at any number of areas of device 100 along the edges shown in order to detect objects that are touching or proximate to those areas. In some of these configurations, proximity sensors can be used in conjunction with a touchscreen of a device to ready the device (e.g., touchscreen) for touch input, as similarly described with reference to the process illustrated in FIG. 9 above. Similarly, although the examples discussed herein focus primarily on wearable devices, it should be noted that the examples discussed herein can be used in other electronic devices having a cover glass, including, but not limited to, cellular phones, laptops, or tablet devices.

Some examples of the disclosure are directed to a wearable device comprising: a housing; a crown configured to receive an input from a user; a proximity sensor configured to generate a field of view encompassing a first area adjacent to the housing and further configured to generate an output signal corresponding to whether an object is present within the field of view; and a processor configured to: determine, based on the output signal, whether the input corresponds to an intentional input or an unintentional input. Additionally or alternatively to one or more of the examples disclosed above, in some examples, the processor may be further configured to: in accordance with a determination that the input corresponds to an intentional input, accept the input; and in accordance with a determination that the input corresponds to an unintentional input, reject the input. Additionally or alternatively to one or more of the examples disclosed above, in some examples, determining that the input corresponds to an unintentional input comprises determining that the output signal corresponds to the presence of the object within the field of view, and determining that the input corresponds to an intentional input comprises determining that the output signal does not correspond to the presence of the object within the field of view. Additionally or alternatively to one or more of the examples disclosed above, in some examples, determining that the input corresponds to an unintentional input comprises determining that the output signal corresponds to the presence of the object within the field of view and at a distance from the proximity sensor less than a threshold distance, and determining that the input corresponds to an intentional input comprises determining that the output signal does not correspond to the presence of the object within the field of view and at a distance from the proximity sensor less than the threshold distance. Additionally or alternatively to one or more of the examples disclosed above, in some examples, the output signal further corresponds to a size or shape of the object, and whether the input corresponds to an intentional input or an unintentional input is determined using the size or shape of the object. Additionally or alternatively to one or more of the examples disclosed above, in some examples, the processor is further configured to determine a vector corresponding to the input, the vector comprising a magnitude and direction of the input, and whether the input corresponds to an intentional input or an unintentional input is determined using the vector. Additionally or alternatively to one or more of the examples disclosed above, in some examples, the processor is further configured to determine a change in the vector over time, and whether the input corresponds to an intentional input or an unintentional input is determined using the change in the vector over time. Additionally or alternatively to one or more of the examples disclosed above, in some examples, the processor is further configured to determine a profile of the input over time, and whether the input corresponds to an intentional input or an unintentional input is determined using the profile. Additionally or alternatively to one or more of the examples disclosed above, in some examples, the profile comprises a duration of the input, and whether the input corresponds to an intentional input or an unintentional input is determined using the duration. Additionally or alternatively to one or more of the examples disclosed above, in some examples, the device further comprises an orientation sensor configured to generate a signal corresponding to an orientation of the device, and whether the input corresponds to an intentional input or an unintentional input is determined using the orientation of the device. Additionally or alternatively to one or more of the examples disclosed above, in some examples, determining that the input corresponds to an unintentional input comprises determining that the device is inverted or oriented vertically with respect to gravity, and determining that the input corresponds to an intentional input comprises determining that the device is not inverted or oriented vertically with respect to gravity. Additionally or alternatively to one or more of the examples disclosed above, in some examples, the housing comprises a cover material having a curved portion, the proximity sensor comprises a light emitter and is disposed normal to a first angle with respect to a plane, a light path of the light emitter is initially about the first angle and is refracted through the curved portion at a second angle, different from the first angle, and the field of view is generated based on the light path. Additionally or alternatively to one or more of the examples disclosed above, in some examples, the processor is further configured to: in response to the crown receiving the input, provisionally accept the input; in accordance with a determination that the input corresponds to an intentional input, confirm the provisional acceptance of the input; and in accordance with a determination that the input corresponds to an unintentional input, back out the provisional acceptance of the input. Additionally or alternatively to one or more of the examples disclosed above, in some examples, the wearable device is configured to enter and exit a rest mode, and the processor is further configured to: in accordance with a determination that the wearable device is in the rest mode and the input corresponds to an intentional input, cause the wearable device to exit the rest mode; and in accordance with a determination that the input corresponds to an unintentional input, forgo causing the wearable device to exit the rest mode.

Some examples of the disclosure are directed to a method comprising: receiving, at a crown of a wearable device, an input from a user of the wearable device; and determining, based on an output signal generated by a proximity sensor of the wearable device, whether the input corresponds to an intentional input or an unintentional input, wherein: the proximity sensor is configured to generate a field of view encompassing a first area adjacent to a housing of the wearable device, and the output signal corresponds to whether an object is present within the field of view. Additionally or alternatively to one or more of the examples disclosed above, in some examples, the method further comprises: in accordance with a determination that the input corresponds to an intentional input, accepting the input; and in accordance with a determination that the input corresponds to an unintentional input, rejecting the input. Additionally or alternatively to one or more of the examples disclosed above, in some examples, determining that the input corresponds to an unintentional input comprises determining that the output signal corresponds to the presence of the object within the field of view, and determining that the input corresponds to an intentional input comprises determining that the output signal does not correspond to the presence of the object within the field of view. Additionally or alternatively to one or more of the examples disclosed above, in some examples, determining that the input corresponds to an unintentional input comprises determining that the output signal corresponds to the presence of the object within the field of view and at a distance from the proximity sensor less than a threshold distance, and determining that the input corresponds to an intentional input comprises determining that the output signal does not correspond to the presence of the object within the field of view and at a distance from the proximity sensor less than the threshold distance. Additionally or alternatively to one or more of the examples disclosed above, in some examples, the output signal further corresponds to a size or shape of the object, and whether the input corresponds to an intentional input or an unintentional input is determined using the size or shape of the object. Additionally or alternatively to one or more of the examples disclosed above, in some examples, the method further comprises determining a vector corresponding to the input, the vector comprising a magnitude and direction of the input, wherein whether the input corresponds to an intentional input or an unintentional input is determined using the vector. Additionally or alternatively to one or more of the examples disclosed above, in some examples, the method further comprises determining a change in the vector over time, wherein whether the input corresponds to an intentional input or an unintentional input is determined using the change in the vector over time. Additionally or alternatively to one or more of the examples disclosed above, in some examples, the method further comprises determining a profile of the input over time, wherein whether the input corresponds to an intentional input or an unintentional input is determined using the profile. Additionally or alternatively to one or more of the examples disclosed above, in some examples, the profile comprises a duration of the input, and whether the input corresponds to an intentional input or an unintentional input is determined using the duration. Additionally or alternatively to one or more of the examples disclosed above, in some examples, the method further comprises receiving, from an orientation sensor, a signal corresponding to an orientation of the device, wherein whether the input corresponds to an intentional input or an unintentional input is determined using the orientation of the device. Additionally or alternatively to one or more of the examples disclosed above, in some examples, the housing comprises a cover material having a curved portion, the proximity sensor comprises a light emitter and is disposed normal to a first angle with respect to a plane, a light path of the light emitter is initially about the first angle and is refracted through the curved portion at a second angle, different from the first angle, and the field of view is generated based on the light path. Additionally or alternatively to one or more of the examples disclosed above, in some examples, the method further comprises: in response to the crown receiving the input, provisionally accepting the input; in accordance with a determination that the input corresponds to an intentional input, confirming the provisional acceptance of the input; and in accordance with a determination that the input corresponds to an unintentional input, backing out the provisional acceptance of the input. Additionally or alternatively to one or more of the examples disclosed above, in some examples, the wearable device is configured to enter and exit a rest mode, and the method further comprises: in accordance with a determination that the wearable device is in the rest mode and the input corresponds to an intentional input, causing the wearable device to exit the rest mode; and in accordance with a determination that the input corresponds to an unintentional input, forgoing causing the wearable device to exit the rest mode.

Some examples of the disclosure are directed to a non-transitory computer-readable storage medium having computer-executable instructions which, when executed by one or more computer processors, cause the one or more computer processors to: receive, at a crown of a wearable device, an input from a user of the wearable device; and determine, based on an output signal generated by a proximity sensor of the wearable device, whether the input corresponds to an intentional input or an unintentional input, wherein: the proximity sensor is configured to generate a field of view encompassing a first area adjacent to a housing of the wearable device, and the output signal corresponds to whether an object is present within the field of view.

Although this disclosure and examples have been fully described with reference to the accompanying figures, it is to be noted that various changes and modifications will become apparent to those skilled in the art. Such changes and modifications are to be understood as being included within the scope of this disclosure and examples as defined by the appended claims.

What is claimed is:

1. A wearable device comprising:
a housing;
a crown configured to receive an input from a user;
a proximity sensor, the proximity sensor configured to generate a field of view encompassing a first area adjacent to a surface of the housing at which the crown is located, the first area excluding the crown, the proximity sensor further configured to generate an output signal corresponding to whether an object is present within the field of view; and
a processor configured to:
determine, based on the output signal of the proximity sensor, whether the input at the crown corresponds to an intentional input or an unintentional input.

2. The wearable device of claim 1, wherein the processor is further configured to:
in accordance with a determination that the input corresponds to an intentional input, accept the input; and
in accordance with a determination that the input corresponds to an unintentional input, reject the input.

3. The wearable device of claim 2, wherein:
determining that the input corresponds to an unintentional input comprises determining that the output signal corresponds to the presence of the object within the field of view, and
determining that the input corresponds to an intentional input comprises determining that the output signal does not correspond to the presence of the object within the field of view.

4. The wearable device of claim 2, wherein:
determining that the input corresponds to an unintentional input comprises determining that the output signal corresponds to the presence of the object within the field of view and at a distance from the proximity sensor less than a threshold distance, and
determining that the input corresponds to an intentional input comprises determining that the output signal does not correspond to the presence of the object within the field of view and at a distance from the proximity sensor less than the threshold distance.

5. The wearable device of claim 4, wherein the output signal further corresponds to a size or shape of the object, and whether the input corresponds to an intentional input or an unintentional input is determined using the size or shape of the object.

6. The wearable device of claim 4, wherein the processor is further configured to:
determine a vector corresponding to a force of the input, the vector comprising a magnitude and angle of the force of the input;
in accordance with a determination that the angle of the input is a first angle, determine that the input corresponds to an intentional input; and
in accordance with a determination that the angle of the input is a second angle greater than the first angle, determine that the input corresponds to an unintentional input.

7. The wearable device of claim 6, wherein the processor is further configured to determine a change in the vector over time, and whether the input corresponds to an intentional input or an unintentional input is determined using the change in the vector over time.

8. The wearable device of claim 4, wherein the processor is further configured to determine a profile of a force of the input over time, and whether the input corresponds to an intentional input or an unintentional input is determined using the profile of the force of the input.

9. The wearable device of claim 8, wherein the profile comprises a duration of the input, and whether the input corresponds to an intentional input or an unintentional input is determined using the duration.

10. The wearable device of claim 4, wherein the device further comprises an orientation sensor configured to generate a signal corresponding to an orientation of the device, and whether the input corresponds to an intentional input or an unintentional input is determined using the orientation of the device.

11. The wearable device of claim 10, wherein:
determining that the input corresponds to an unintentional input comprises determining that the device is inverted or oriented vertically with respect to gravity, and
determining that the input corresponds to an intentional input comprises determining that the device is not inverted or oriented vertically with respect to gravity.

12. The wearable device of claim 1, wherein:
the housing comprises a cover material having a curved portion,
the proximity sensor comprises a light emitter and is disposed normal to a first angle with respect to a plane,
a light path of the light emitter is initially about the first angle and is refracted through the curved portion at a second angle, different from the first angle, and
the field of view is generated based on the light path.

13. The wearable device of claim 1, wherein the processor is further configured to:
in response to the crown receiving the input, provisionally accept the input;
in accordance with a determination that the input corresponds to an intentional input, confirm the provisional acceptance of the input; and in accordance with a determination that the input corresponds to an unintentional input, back out the provisional acceptance of the input.

14. The wearable device of claim 1, wherein:
the wearable device is configured to enter and exit a rest mode, and
the processor is further configured to:
in accordance with a determination that the wearable device is in the rest mode and the input corresponds to an intentional input, cause the wearable device to exit the rest mode; and
in accordance with a determination that the input corresponds to an unintentional input, forgo causing the wearable device to exit the rest mode.

15. A method comprising:
receiving, at a crown of a wearable device, an input from a user of the wearable device; and
determining, based on an output signal generated by a proximity sensor of the wearable device, whether the input corresponds to an intentional input or an unintentional input,
wherein:
the proximity sensor is configured to generate a field of view encompassing a first area adjacent to a surface of a housing of the wearable device at which the crown is located, the first area excluding the crown, and
the output signal corresponds to whether an object is present within the field of view.

16. The method of claim 15, further comprising:
in accordance with a determination that the input corresponds to an intentional input, accepting the input; and
in accordance with a determination that the input corresponds to an unintentional input, rejecting the input.

17. The method of claim 16, wherein:
determining that the input corresponds to an unintentional input comprises determining that the output signal corresponds to the presence of the object within the field of view, and
determining that the input corresponds to an intentional input comprises determining that the output signal does not correspond to the presence of the object within the field of view.

18. The method of claim 16, wherein:
determining that the input corresponds to an unintentional input comprises determining that the output signal corresponds to the presence of the object within the field of view and at a distance from the proximity sensor less than a threshold distance, and
determining that the input corresponds to an intentional input comprises determining that the output signal does not correspond to the presence of the object within the field of view and at a distance from the proximity sensor less than the threshold distance.

19. The method of claim 18, wherein the output signal further corresponds to a size or shape of the object, and whether the input corresponds to an intentional input or an unintentional input is determined using the size or shape of the object.

20. The method of claim 18, further comprising:
determining a vector corresponding to the input, the vector comprising a magnitude and angle of a force of the input;
in accordance with a determination that the angle of the input is a first angle, determining that the input corresponds to an intentional input; and in accordance with a determination that the angle of the input is a second angle greater than the first angle, determining that the input corresponds to an unintentional input.

21. The method of claim 20, further comprising determining a change in the vector over time, wherein whether the input corresponds to an intentional input or an unintentional input is determined using the change in the vector over time.

22. The method of claim 18, further comprising determining a profile of a force of the input over time, wherein whether the input corresponds to an intentional input or an unintentional input is determined using the profile.

23. The method of claim 22, wherein the profile comprises a duration of the input, and whether the input corresponds to an intentional input or an unintentional input is determined using the duration.

24. The method of claim 18, further comprising receiving, from an orientation sensor, a signal corresponding to an orientation of the device, wherein whether the input corresponds to an intentional input or an unintentional input is determined using the orientation of the device.

25. The method of claim 24, wherein:
determining that the input corresponds to an unintentional input comprises determining that the device is inverted or oriented vertically with respect to gravity, and
determining that the input corresponds to an intentional input comprises determining that the device is not inverted or oriented vertically with respect to gravity.

26. The method of claim 15, wherein:
the housing comprises a cover material having a curved portion,
the proximity sensor comprises a light emitter and is disposed normal to a first angle with respect to a plane,
a light path of the light emitter is initially about the first angle and is refracted through the curved portion at a second angle, different from the first angle, and
the field of view is generated based on the light path.

27. The method of claim 15, further comprising:
in response to the crown receiving the input, provisionally accepting the input;
in accordance with a determination that the input corresponds to an intentional input, confirming the provisional acceptance of the input; and
in accordance with a determination that the input corresponds to an unintentional input, backing out the provisional acceptance of the input.

28. The method of claim 15, wherein the wearable device is configured to enter and exit a rest mode, the method further comprising:
in accordance with a determination that the wearable device is in the rest mode and the input corresponds to an intentional input, causing the wearable device to exit the rest mode; and
in accordance with a determination that the input corresponds to an unintentional input, forgoing causing the wearable device to exit the rest mode.

29. A non-transitory computer-readable storage medium having computer-executable instructions which, when executed by one or more computer processors, cause the one or more computer processors to:
receive, at a crown of a wearable device, an input from a user of the wearable device; and
determine, based on an output signal generated by a proximity sensor of the wearable device, whether the input corresponds to an intentional input or an unintentional input, wherein:
 the proximity sensor is configured to generate a field of view encompassing a first area adjacent to a surface of a housing of the wearable device at which the crown is located, the first area excluding the crown, and
 the output signal corresponds to whether an object is present within the field of view.

\* \* \* \* \*